US008645421B2

(12) United States Patent
Meric et al.

(10) Patent No.: US 8,645,421 B2
(45) Date of Patent: Feb. 4, 2014

(54) ATTRIBUTE BASED HIERARCHY MANAGEMENT FOR ESTIMATION AND FORECASTING

(75) Inventors: Necati Burak Meric, Cary, NC (US);
Yung-Hsin Chien, Apex, NC (US);
Thomas Burkhardt, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1408 days.

(21) Appl. No.: 12/241,784

(22) Filed: Sep. 30, 2008

(65) Prior Publication Data
US 2010/0082521 A1    Apr. 1, 2010

(51) Int. Cl.
*G06F 7/00* (2006.01)
*G06F 17/30* (2006.01)
*G06Q 10/00* (2012.01)

(52) U.S. Cl.
USPC .......................................... 707/778; 705/7.29

(58) Field of Classification Search
USPC ........... 705/313, 7.29, 7.31; 706/53; 707/756, 707/778
See application file for complete search history.

(56) References Cited

U.S. PATENT DOCUMENTS

| 5,487,131 | A | * | 1/1996 | Kassatly et al. | 706/53 |
|---|---|---|---|---|---|
| 5,651,101 | A | * | 7/1997 | Gotoh et al. | 706/53 |
| 5,838,965 | A | * | 11/1998 | Kavanagh et al. | 1/1 |
| 5,918,232 | A | | 6/1999 | Pouschine et al. | |
| 6,009,407 | A | | 12/1999 | Garg | |
| 6,611,726 | B1 | | 8/2003 | Crosswhite | |
| 7,080,026 | B2 | | 7/2006 | Singh et al. | |
| 7,092,918 | B1 | * | 8/2006 | Delurgio et al. | 705/400 |
| 7,240,019 | B2 | | 7/2007 | Delurgio et al. | |
| 7,246,083 | B2 | | 7/2007 | Bibelnieks et al. | |
| 7,660,734 | B1 | | 2/2010 | Neal et al. | |
| 7,672,865 | B2 | * | 3/2010 | Kumar et al. | 705/7.33 |
| 7,689,456 | B2 | | 3/2010 | Schroeder et al. | |
| 7,805,698 | B1 | * | 9/2010 | Ferguson et al. | 716/103 |
| 8,010,404 | B1 | | 8/2011 | Wu et al. | |
| 8,065,178 | B2 | * | 11/2011 | Lloyd et al. | 705/7.29 |
| 2005/0055275 | A1 | | 3/2005 | Newman et al. | |
| 2005/0137899 | A1 | | 6/2005 | Davies et al. | |
| 2006/0020610 | A1 | | 1/2006 | Herrick et al. | |
| 2007/0106550 | A1 | | 5/2007 | Umblijs et al. | |
| 2007/0203783 | A1 | | 8/2007 | Beltramo | |
| 2007/0208608 | A1 | * | 9/2007 | Amerasinghe et al. | 705/10 |
| 2008/0120129 | A1 | * | 5/2008 | Seubert et al. | 705/1 |
| 2009/0222400 | A1 | * | 9/2009 | Kupershmidt et al. | 706/52 |

OTHER PUBLICATIONS

Harvey, Andrew, "Forecasting with Unobserved Components Time Series Models," Faculty of Economics, University of Cambridge, Prepared for Handbook of Economic Forecasting, pp. 1-89 (Jul. 2004).

* cited by examiner

*Primary Examiner* — Jami A Plucinski
*Assistant Examiner* — Amanda Kirlin
(74) *Attorney, Agent, or Firm* — Kilpatrick Townsend & Stockton LLP

(57) ABSTRACT

Computer-implemented systems and methods generate forecasts or estimates with respect to one or more attributes contained in an attribute-based hierarchy. Physical hierarchical data and attribute input data are received so that an attribute-based hierarchy can be created. A mapping table is created that indicates relationships between the attribute-based hierarchy and the physical hierarchy, wherein the attribute-based hierarchy is accessed during model forecasting analysis or model estimation analysis.

42 Claims, 17 Drawing Sheets

ATTRIBUTE BASED HIERARCHY MANAGEMENT FOR ESTIMATION AND FORECASTING

TECHNICAL FIELD

This document relates generally to computer-implemented forecasting and estimation systems, and more particularly to computer-implemented hierarchical model forecasting and estimation systems.

BACKGROUND

Organizations often face the challenge of making decisions today in preparation for future events. These future events are variable in nature and oftentimes difficult to predict. Examples of these future variables include demand for a product, weather, consumer confidence, commodity prices, interest rates, as well as many others. To aid in making present decisions in preparation for unknown future scenarios, organizations utilize forecasting and estimation models to examine future states of these variables.

Organizational data can be expressed as hierarchical data structures. For example, a global retail sales company may have its stores organized by country, then by region, then by city, and then by individual store. In a further example, sales data for a product may be stored by year, then by quarter, then by month, and then by day. In keeping records, organizations may store the hierarchically arranged data in a multidimensional data store such as a multidimensional database or a relational database adapted to handle hierarchical data. These data hierarchies stored according to the requirements of an organization are called physical hierarchies. They may also be referred to as organizational or standard hierarchies. While these physical hierarchies are arranged to satisfy certain data storage needs of an organization, the physical hierarchies may often not be adequate to handle complex forecasting and estimation problems.

SUMMARY

In accordance with the teachings provided herein, computer-implemented systems and methods provide forecasts or estimates with respect to one or more attributes contained in an attribute-based hierarchy, wherein the physical hierarchy is representative of an operational framework of an organization or products or services provided by the organization or combinations thereof. As an illustration, a system receives physical hierarchical data indicative of the physical hierarchy's structure and attribute input data that describes one or more attributes of entities of the physical hierarchy. The system creates an attribute-based hierarchy based upon the received physical hierarchical data and attribute data such that the created attribute-based hierarchy contains at least one level described by the received attribute input data. The system creates a mapping table that indicates relationships between the attribute-based hierarchy and the physical hierarchy, wherein the attribute-based hierarchy is accessed during model forecasting analysis or model estimation analysis.

As another illustration, a computer-implemented system and method of model forecasting or model estimation receives physical hierarchical data indicative of the physical hierarchy structure and receives attribute data that describes one or more attributes of entities of the physical hierarchy. The received attribute input data contains missing attribute data corresponding to at least one entity associated with the physical hierarchy. An attribute-based hierarchy is created based upon the received physical hierarchical data and attribute input data such that the created attribute-based hierarchy contains at least one level described by the received attribute input data using dummy nodes in the attribute-based hierarchy as placeholders for the missing attribute input data. A mapping table indicating relationships between the attribute-based hierarchy and the physical hierarchy is also created.

As another illustration, a system and method may include physical hierarchical data indicative of the physical hierarchy's structure and attribute input data that describes one or more attributes of entities of the physical hierarchy. An attribute-based hierarchy generator generates an attribute-based hierarchy based upon the physical hierarchical data and the attribute input data, wherein the generated attribute-based hierarchy contains at least one level described by the received attribute input data. The system also includes a mapping table generator that generates a mapping table indicating relationships between the attribute-based hierarchy and the physical hierarchy, wherein the attribute-based hierarchy is accessed during model forecasting analysis or model estimation analysis of the one or more attributes.

As a further illustration, a system may include means for receiving physical hierarchical data indicative of the physical hierarchy's structure and attribute input data that describes one or more attributes of entities of the physical hierarchy. The system further includes means for creating an attribute-based hierarchy based upon the physical hierarchical data and the attribute input data, wherein the generated attribute-based hierarchy contains at least one level described by the received attribute input data. The system also includes a means for creating a mapping table indicating relationships between the attribute-based hierarchy and the physical hierarchy, wherein the attribute-based hierarchy is accessed during model forecasting analysis or model estimation analysis of the one or more attributes.

DETAILED DESCRIPTION

Figure 1:
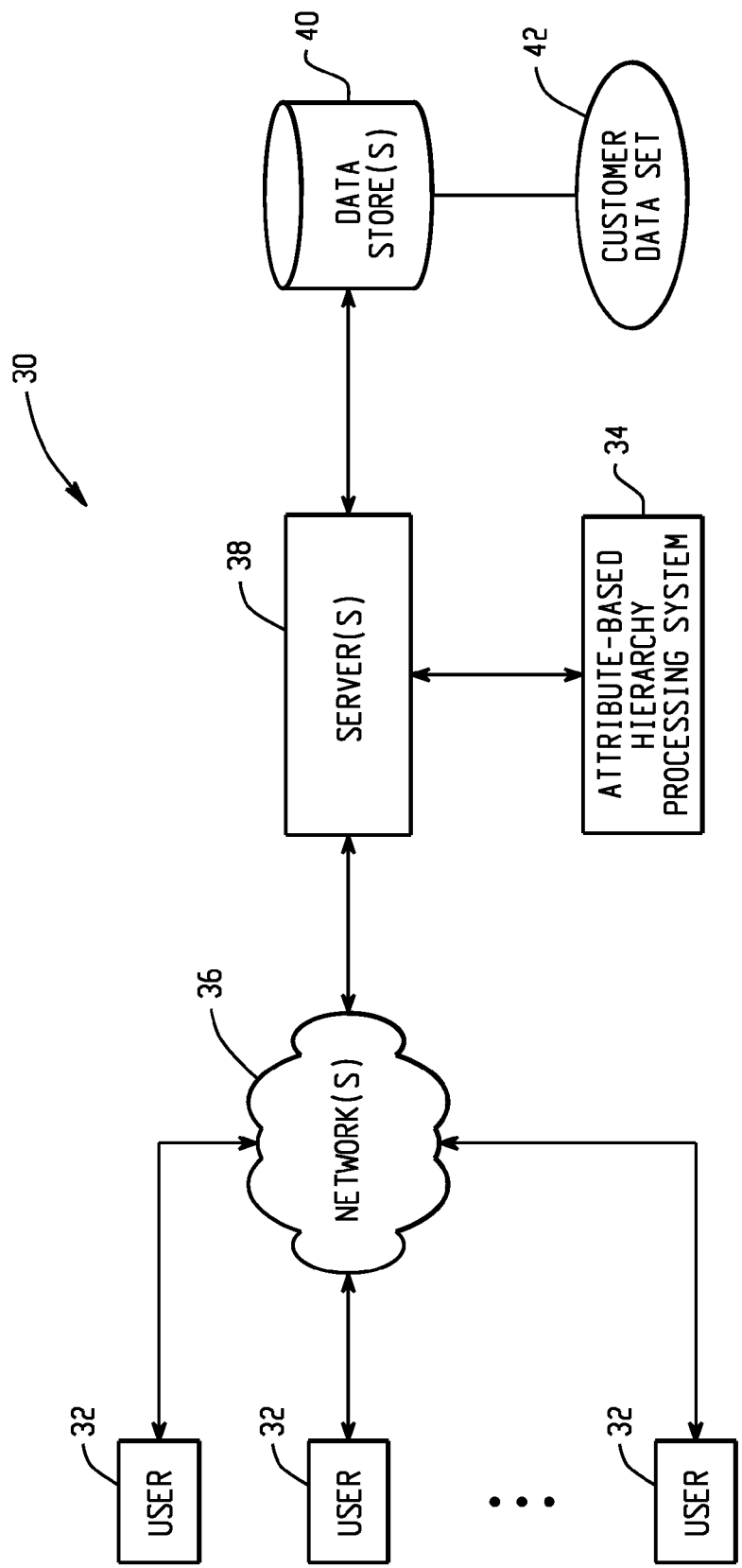
FIG. 1 is a block diagram depicting a computer-implemented environment wherein users can interact with an attribute-based hierarchy processing system.

FIG. 1 depicts at 30 a computer-implemented environment wherein users 32 can interact with an attribute-based hierarchy processing system 34 hosted on one or more servers 38 through a network 36. The system 34 contains software operations or routines for generating an attribute-based hierarchy. The attribute-based hierarchy processing system 34 generates an attribute-based hierarchy using received physical hierarchical data and attribute input data.

An attribute-based hierarchy re-categorizes the physical hierarchy such that new and different analyses can be performed based on the re-categorization with a reduction in expensive preprocessing. For example, a physical hierarchy may be modified to include a level describing the climate zone (e.g., North (cooler climate zone) vs. South (warmer climate zone)) in which a store resides. Model forecasting and estimations that include climate zone analysis may then be more easily performed on the attribute-based hierarchy compared to the physical hierarchy without the attribute-based modifications.

Physical hierarchical data refers to organizational data in a format where hierarchical relationships among the data are maintained. Oftentimes, physical hierarchical data will be received to be analyzed in the form as it is stored by an organization. Data stores such as a multidimensional database or a relational database (that is modified to handle data having multidimensional characteristics) are well suited for handling data that is hierarchical in nature. However, data stored in other formats may be manipulated into a hierarchical structure such that it becomes physical hierarchical data.

While a physical hierarchy may contain large amounts of raw data, the physical hierarchy may not be optimally structured for computing some desired, complex forecasting or estimation scenarios without significant preprocessing of the physical hierarchy data. An attribute-based hierarchy enables more efficient and diverse calculation of these certain desired, complex forecasting or estimation models by inserting levels (e.g., components) into the physical hierarchy to enable simplified calculations based on data that is further categorized from the originating physical hierarchy.

The attribute-based hierarchy processing system 34 can be an integrated web-based analysis tool that provides users flexibility and functionality for performing model forecasting or estimation or can be a wholly automated system. The system 34 may also be implemented on a standalone computer or other platforms. One or more data stores 40 can store the data to be analyzed by the system 34 as well as any intermediate or final data generated by the system 34. For example, data store(s) 40 can store data 42 from a customer (e.g., the physical hierarchy data) and attribute input data for use in determining an attribute-based hierarchy. Examples of data store(s) 40 can include relational database management systems (RDBMS), a multi-dimensional database (MDDB), such as an Online Analytical Processing (OLAP) database, etc.

The users 32 can interact with the system 34 through a number of ways, such as over one or more networks 36. One or more servers 38 accessible through the network(s) 36 can host the attribute-based hierarchy processing system 34. It should be understood that the attribute-based hierarchy processing system 34 could also be provided on a stand-alone computer for access by a user.

Figure 2:
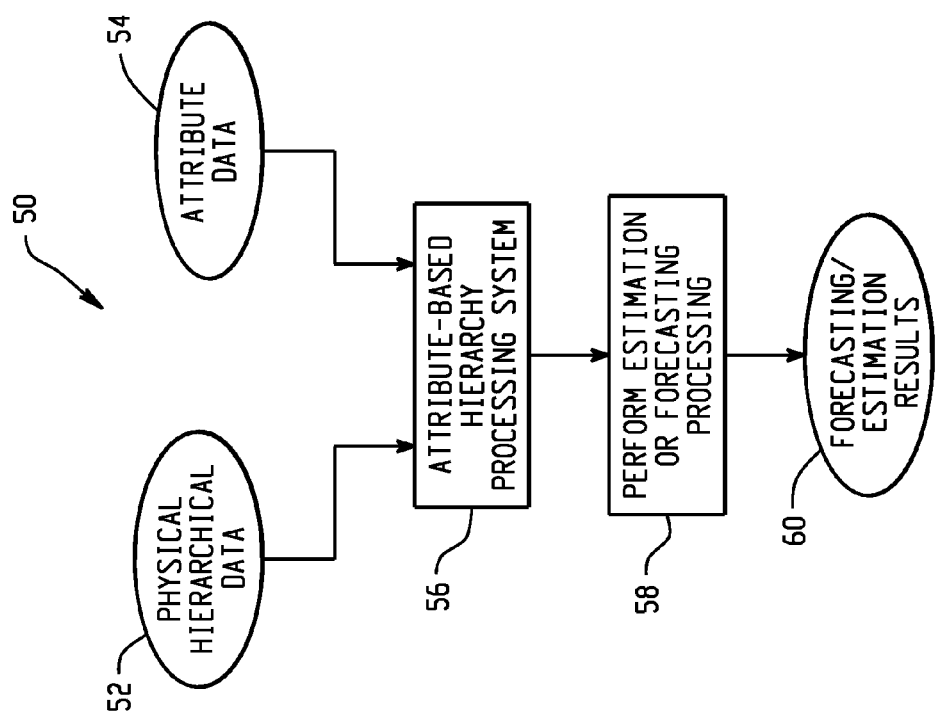
FIG. 2 is a flow diagram depicting a process of calculating forecasting/estimation results using an attribute-based hierarchy processing system.

FIG. 2 depicts at 50 a flow diagram depicting a method for generating forecasting/estimation results using an attribute-based hierarchy processing system 56. The process includes the attribute-based hierarchy processing system 56 receiving physical hierarchical data 52 and attribute data 54 that further describes one or more attributes of entities within the physical hierarchical data 52. Utilizing the received physical hierarchical data 52 and attribute data 54, the attribute-based hierarchy processing system 56 generates an attribute-based hierarchy. Computations are then performed utilizing the created attribute-based hierarchy in step 58 to generate forecasting or estimation results 60.

Figure 3:
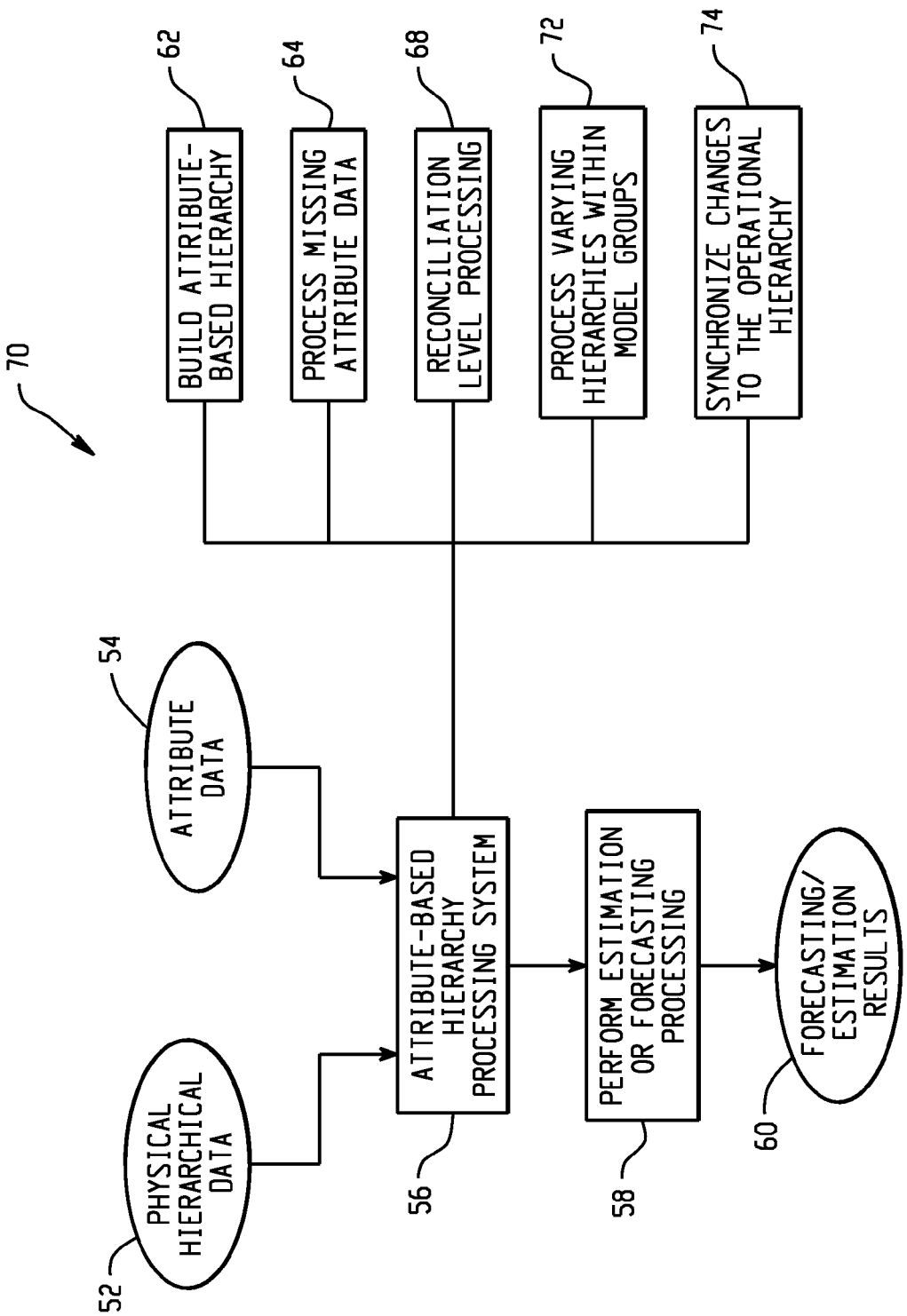
FIG. 3 is a flow diagram depicting features that may be incorporated into an attribute-based hierarchy processing system.

FIG. 3 depicts at 70 a flow diagram illustrating features that may be incorporated into an attribute-based hierarchy processing system 56. As discussed with reference to FIG. 2, the attribute-based hierarchy processing system 56 receives physical hierarchical data 52 and attribute data 54. The attribute-based hierarchy processing system 56 may then implement one or more of the following: including building an attribute-based hierarchy 62, processing missing attribute data 65, performing level reconciliation processing 68, processing varying hierarchies within model groups 72, and synchronizing changes to the operational hierarchy 74.

Figure 4:
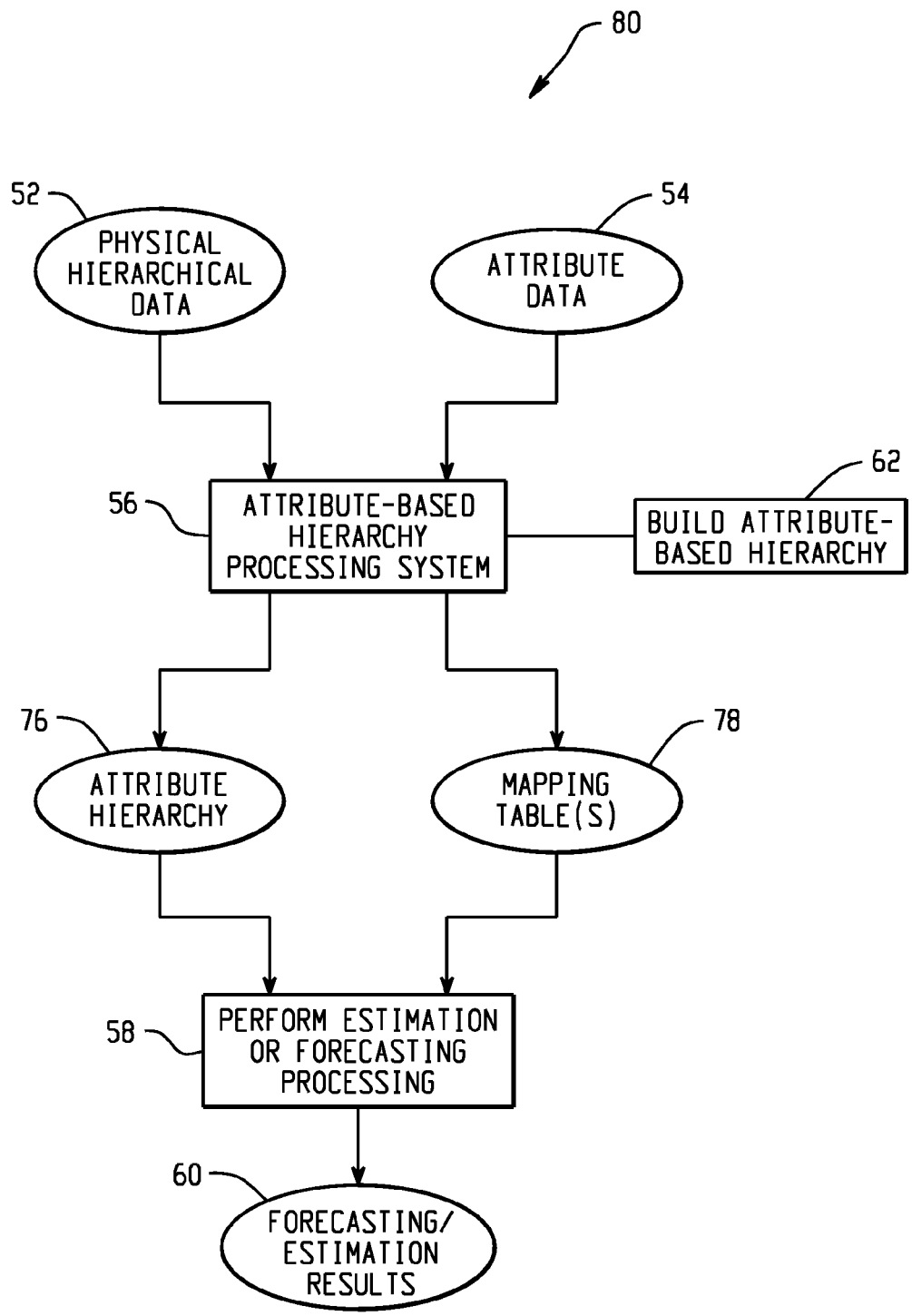
FIG. 4 is a flow diagram depicting a process for building an attribute-based hierarchy and utilizing the attribute-based hierarchy to generate forecasts/estimations.

FIG. 4 depicts at 80 a flow diagram illustrating a process for building an attribute-based hierarchy 76 and utilizing the attribute-based hierarchy 76 in generating forecasts/estimation results 60. As described previously with reference to FIG. 2, the attribute-based hierarchy processing system 56 receives physical hierarchical data 52 and attribute input data 54. The attribute-based hierarchy processing system 56 then builds an attribute-based hierarchy 76 in step 62 by integrating the received attribute input data 54 into the physical hierarchical data 52. The attribute-based hierarchy processing system 56 outputs the created attribute hierarchy 76 as well as one or more associated mapping tables 78. The mapping tables may include a variety of data that aids in calculations involving the attribute hierarchy 76 as well as the re-creation of the attribute hierarchy 76. Following generation of the attribute-based hierarchy 76, estimation or forecasting processing can be performed in step 58 to generate desired forecasting/estimation results 60.

Figure 5:
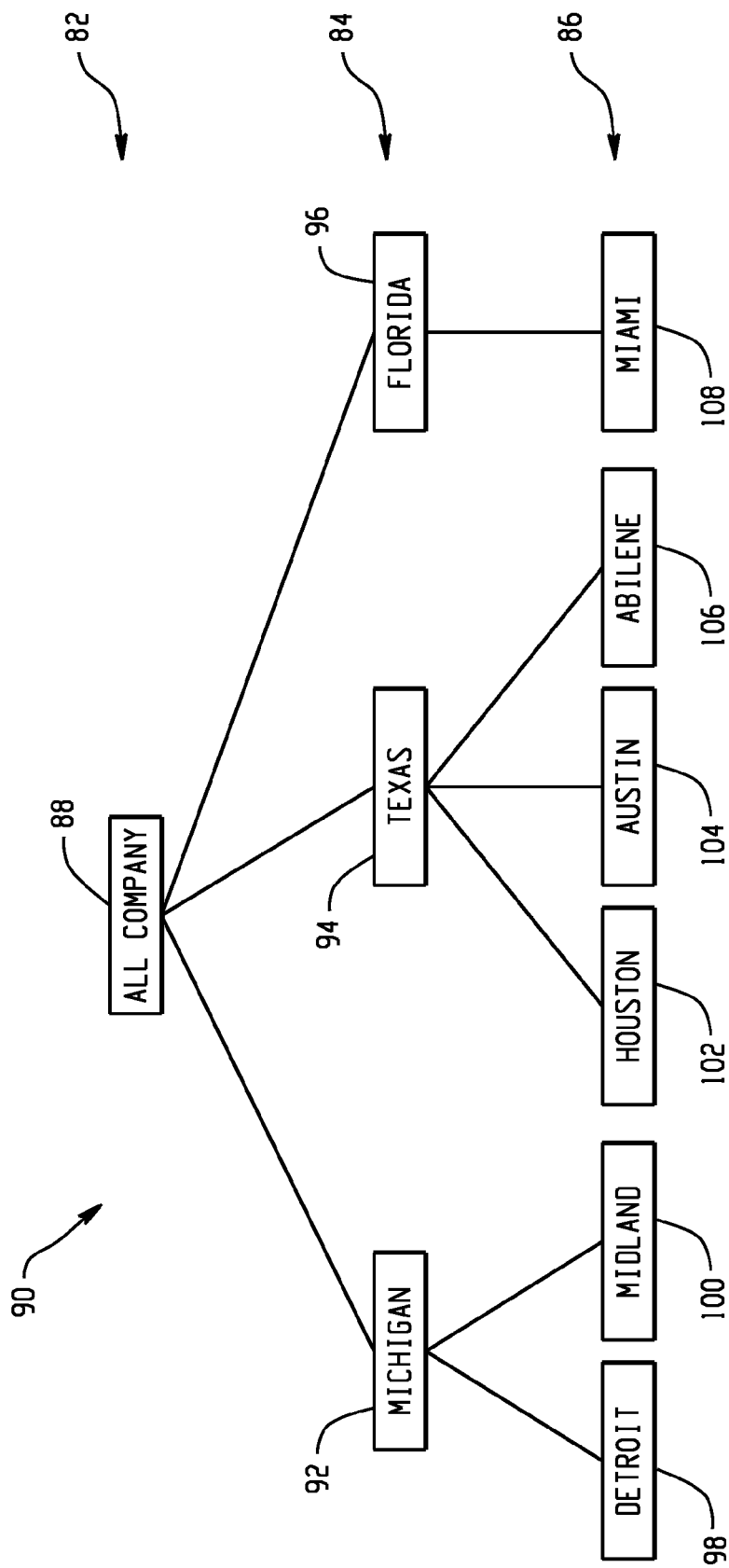
FIG. 5 depicts an example physical hierarchy.
Figure 6:
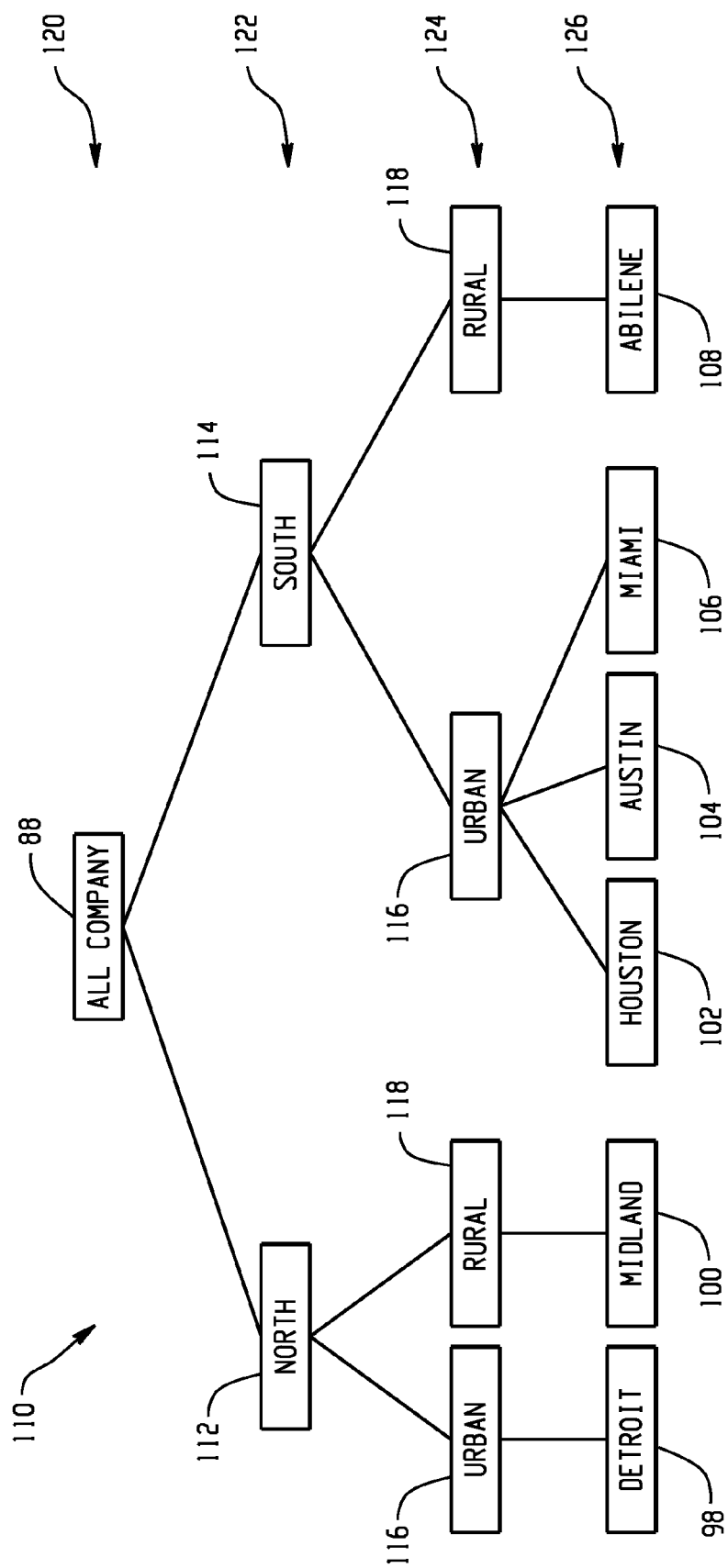
FIG. 6 depicts a generated attribute-based hierarchy.

FIGS. 5 and 6 illustrate an example build of an attribute-based hierarchy 76 and associated mapping table 78 based on received physical hierarchical data 52 and attribute data 54. FIG. 5 depicts at 90 an example physical hierarchy. The depicted physical hierarchy contains three levels representing a company. The first level 82 contains all stores for the entire U.S. based company as depicted by the All Company node 88. The second level 84 breaks the All Company 88 node into the states where the stores of the company are located. The State level 84 contains three states: Michigan 92, Texas 94, and Florida 96. Below the State level 84 is the Store level 86 which includes each of the individual stores within the company. The Store level 86 contains stores located in: Detroit 98, Midland 100, Houston 102, Austin 104, Abilene 106, and Miami 108. The hierarchical nature of the data depicted in FIG. 5 facilitates the understanding of parent-child type relationships within the data. For instance, one can ascertain that the Miami store 108 is located in Florida 96. One can also see that Texas 94 contains 3 stores: Houston 102, Austin 104, and Abilene 106.

In addition to physical hierarchical data such as that depicted in FIG. 5, the attribute-based hierarchy processing system 56 receives attribute data such as is shown in Table 1. A user may select the attributes to be included in the attribute based hierarchy and the hierarchical order of the resulting attribute based hierarchy in order to meet their forecasting or modeling needs. This attribute data may be stored within the same database as the physical hierarchical data 52 or it may be stored elsewhere, such as in an external data store. The attribute input data depicted in Table 1 includes the names of attributes, the nodes that contain the listed attributes, and the value of the attribute. The example attribute data of Table 1 lists additional attributes of Climate Zone and Demographics. Each of the six stores depicted in FIG. 5 has a corresponding Climate Zone and Demographics attribute value in Table 1.

TABLE 1

Attribute Input Table

| Attribute Name | Store | Attribute Value |
| --- | --- | --- |
| Climate Zone | Detroit | North |
| Climate Zone | Midland | North |
| Climate Zone | Houston | South |
| Climate Zone | Austin | South |
| Climate Zone | Abilene | South |
| Climate Zone | Miami | South |
| Demographics | Detroit | Urban |
| Demographics | Midland | Rural |
| Demographics | Houston | Urban |
| Demographics | Austin | Urban |
| Demographics | Abilene | Rural |
| Demographics | Miami | Urban |

Following receipt of the physical hierarchical data depicted in FIG. 5 and the attribute data listed in Table 1, the attribute-based hierarchy processing system 56 builds the attribute-based hierarchy 110 depicted in FIG. 6 and the mapping table 78 shown in Table 2.

TABLE 2

Mapping Table

| Level Id | Level Name | Is in physical |
| --- | --- | --- |
| 1 | All Company | 1 |
| 2 | Climate Zone | 0 |
| 3 | Demographics | 0 |
| 4 | Store | 1 |

The generated attribute-based hierarchy 110 has 4 levels. The first level 120 is the All Company level 120 which contains the North 112 and South 114 climates shown on the Climate Zone level 122. The Climate Zone level 122 is further divided into Urban 116 and Rural 118 demographics in the Demographics level 124. The individual stores are then appropriately categorized on the Store level 126. The generated attribute-based hierarchy 110 may contain all, some, or none of the levels included in the physical hierarchy 90. The order of the levels inserted into the attribute-based hierarchy 110 could also be varied. For example, the Demographics level 124 could be switched with the Climate Zone level 122 such that the Demographics level 124 would appear as the second level in the attribute-based hierarchy 110 directly below the All Company level 120. The Climate Zone level 122 would then appear as the third level in the hierarchy.

The mapping table 78 shown in Table 2 identifies the generated structure of the attribute-based hierarchy 110. The mapping table 78 states that the attribute-based hierarchy 110 has four levels. It also details the order of the levels according Level ID field. Thus, the All Company level 120 holds the top hierarchical position followed by the Climate Zone level 122. The Demographics level 124 and the Store level 126 appear third and fourth in the hierarchy respectively. The example mapping table 78 also states whether the levels of the attribute-based hierarchy 110 appear in the physical hierarchy 90. In this example, both the All Company level 120 and the Store level 126 appear in both the physical hierarchy 90 and the attribute-based hierarchy 110. The mapping table 78 may contain a greater or fewer number of fields. It may also be created, as is the case in this example, such that the attribute-based hierarchy 110 may be reconstructed with reference to only the physical hierarchy data 52, the attribute data 54, and the mapping table 78.

The generated attribute-based hierarchy 110 enables users or computers that do model forecasting or estimation to more flexibly incorporate attributes in the modeling process that may not be of interest in a physical hierarchy. In this example, demographic and climate zone criteria may be added into the model calculations with reduced processing overhead. More specifically, if one wished to examine sales data for the Southern climate zone's Urban stores, the attribute-based hierarchy 110 enables fast identification of Houston 102, Austin 104, and Miami 106 as the relevant stores from which to examine data. For example, the data associated with the Houston node 102 could contain sales data related to stores in the Houston area. Nodes higher in the hierarchy 110 such as at the Climate Zone level 122 and the Demographics level 124 may contain mapping data identifying where in the hierarchy the Store level 126 nodes reside.

By incorporating the Climate Zone level 122 and the Demographics level 124, analyses may be done based on aggregations on these levels as if the levels existed in the physical hierarchy. In contrast, this initial categorization is not easily accomplished utilizing only the physical hierarchy 90 because demographic and climate zone information is not available without reference to data external to the physical hierarchy. As models become increasingly complex and are executed a large numbers of times, this increased computational cost becomes significant.

Figure 7:
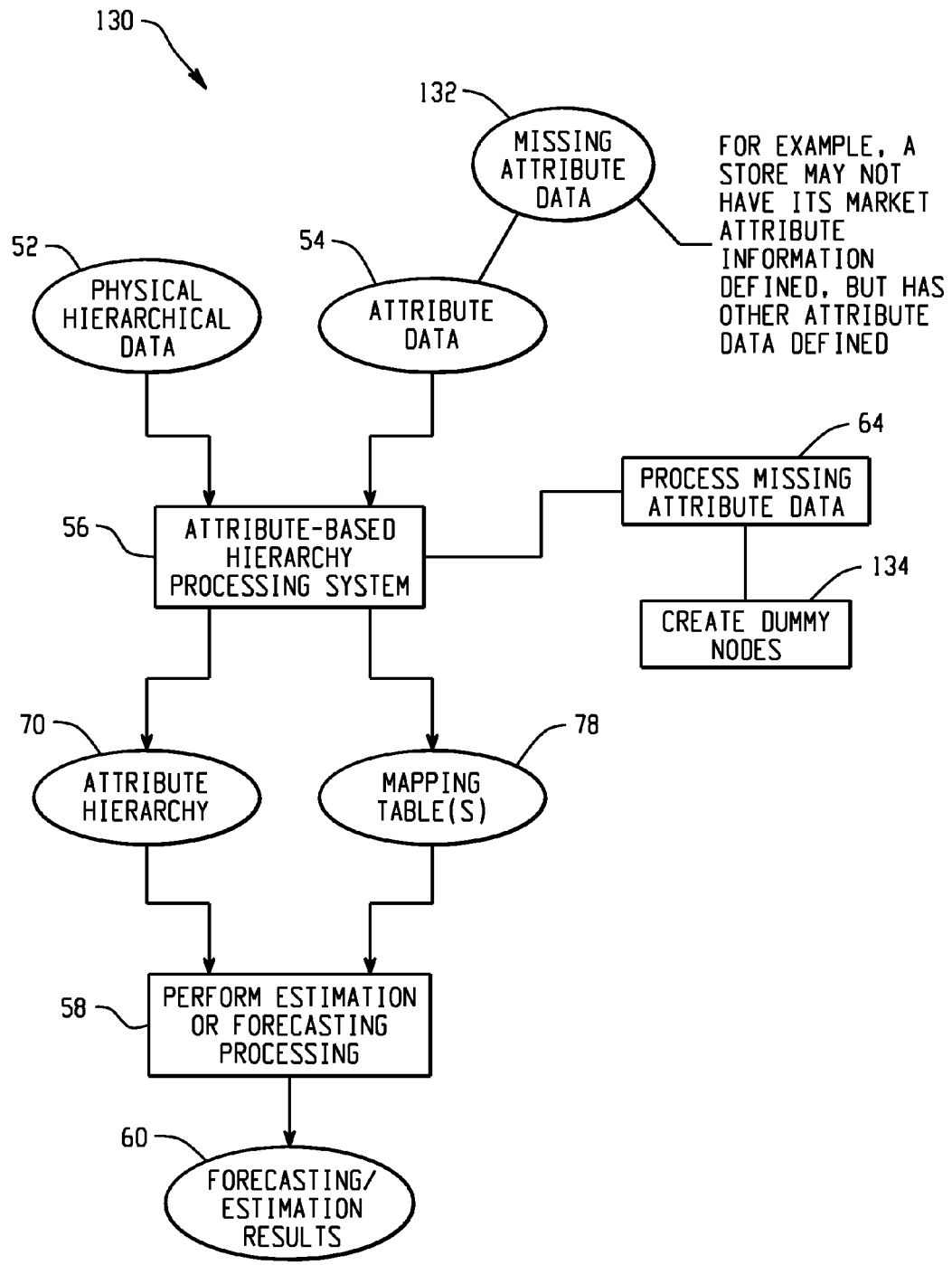
FIG. 7 is a block diagram depicting an attribute-based hierarchy processing system that handles missing attribute data.

It is sometimes the case that stored data sets may be incomplete. FIG. 7 depicts an attribute-based hierarchy processing system that handles a situation involving missing attribute data. The attribute-based hierarchy processing system 56 receives physical hierarchical data 52 and attribute data 54. In this example, the received attribute data 54 is missing attribute data as indicated at 132. For example, a store may not have its market attribute information defined, but may have other attribute data defined. The attribute-based hierarchy processing system 56 processes the physical hierarchical data 52 and attribute data 54 (that is missing some values) at 64. To generate the attribute-based hierarchy output 70, the attribute-based hierarchy processing system 56 creates dummy nodes as shown at 134 as placeholders for the missing data. These dummy nodes allow calculations to be performed on the attribute-based hierarchy despite the missing attribute data 132. The attribute-based hierarchy processing system 56 outputs the attribute-based hierarchy 70 and one or more mapping tables 78 which are utilized in performing estimation or forecasting processing 58 to generate forecasting/estimation results 60.

Figure 8:
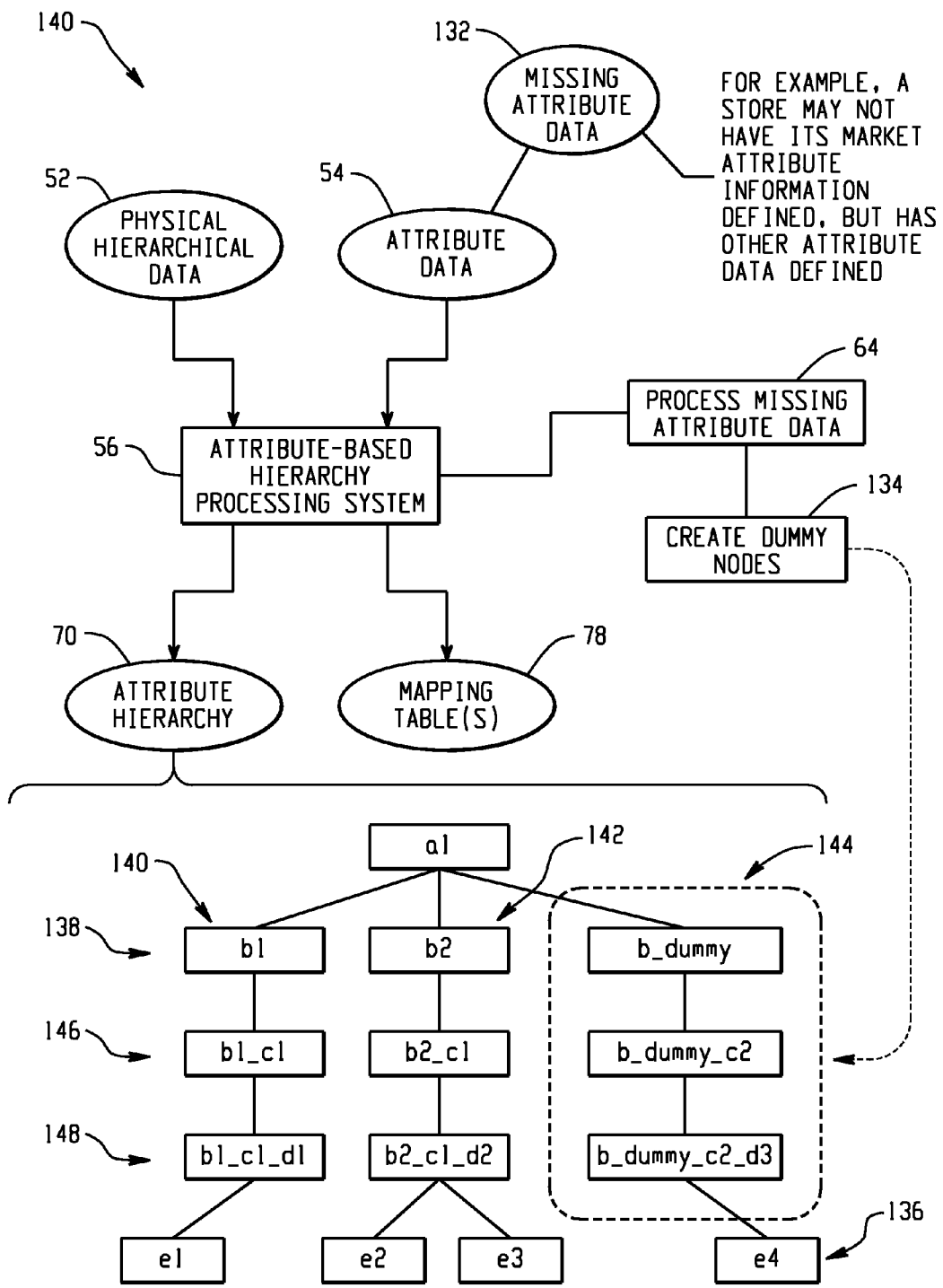
FIG. 8 is a flow diagram depicting a process for generating an attribute hierarchy having missing attribute data.

FIG. 8 is a flow diagram depicting a process for generating an attribute hierarchy having missing attribute data. In this flow diagram, the attribute-based hierarchy processing system 56 receives physical hierarchical data 52 and attribute data 54 that is missing some records as noted at 132. The attribute-based hierarchy processing system 56 processes the missing attribute data at 64 through the creation of dummy nodes 134. The attribute-based hierarchy processing system 56 outputs the one or more mapping tables 78 and the attribute hierarchy depicted at 70. In the example of FIG. 8, the 'e4' node is missing attribute data at the 'b' level 138. Because 'e4' lacks attribute data for the 'b' level 138, the 'e4' node 136 cannot be placed into one of the 'b1' 140 or 'b2' 142 branches. To minimize disruption by the missing data, the 'e4' node 136 is placed into the 'b_dummy' branch 144. Further processing of the 'e4' node 136 progresses normally according to the 'c' level 146 and 'd' level 148 attribute data associated with the 'e4' node 136.

Figure 9:
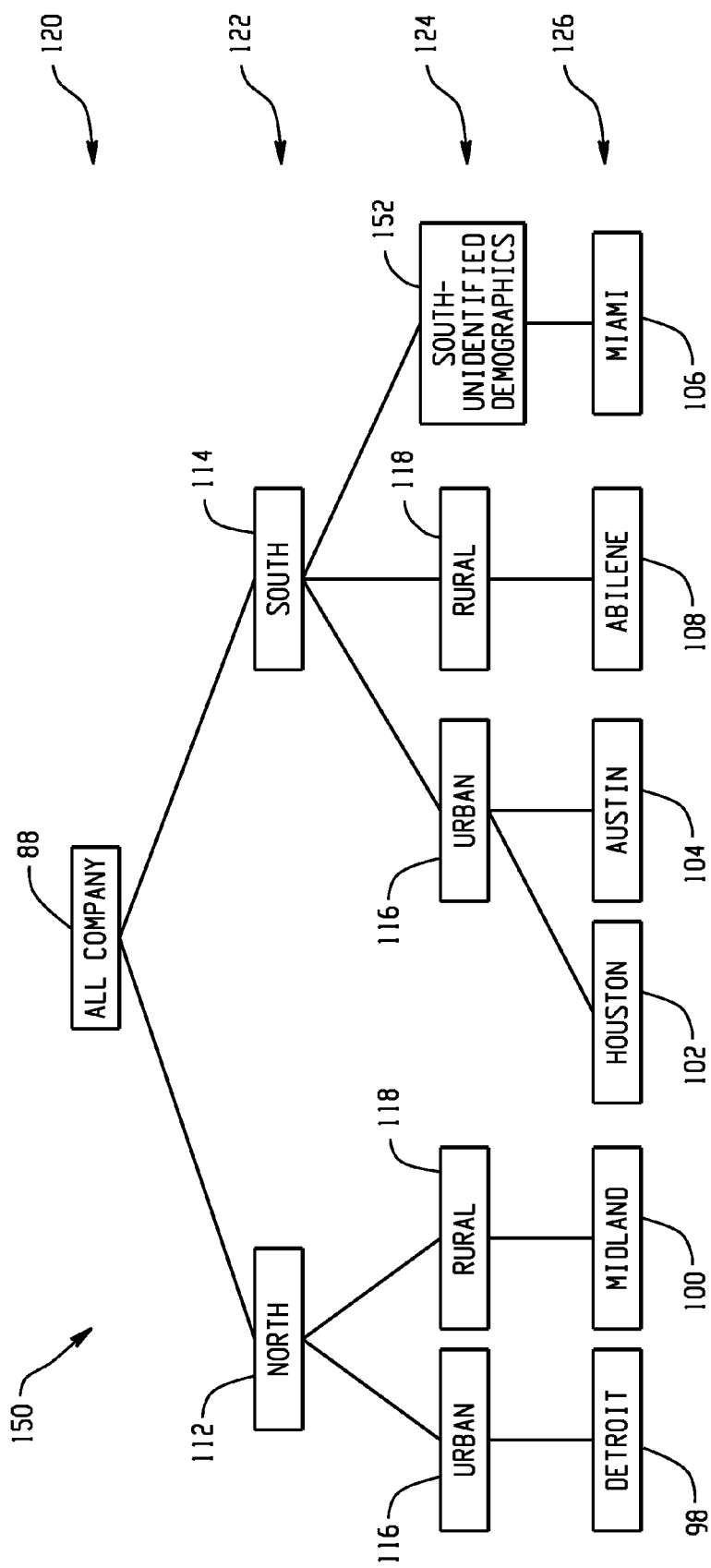
FIG. 9 depicts an example attribute-based hierarchy having missing attribute data.

FIG. 9 depicts an example attribute-based hierarchy 150 having missing attribute data. In generating this example attribute-based hierarchy 150, the attribute-based hierarchy processing system received the same physical hierarchy data illustrated in FIG. 5 at 90. The attribute-based hierarchy processing system 56 also received the attribute data 54 shown in Table 3.

TABLE 3

Attribute Data Having Missing Data

| Attribute Name | Store | Attribute Value |
| --- | --- | --- |
| Climate Zone | Detroit | North |
| Climate Zone | Midland | North |
| Climate Zone | Houston | South |
| Climate Zone | Austin | South |
| Climate Zone | Abilene | South |
| Climate Zone | Miami | South |
| Demographics | Detroit | Urban |
| Demographics | Midland | Rural |
| Demographics | Houston | Urban |
| Demographics | Austin | Urban |
| Demographics | Abilene | Rural |

The attribute data 54 provided to the attribute-based hierarchy processing system 56 contains climate zone attribute data for each of the six stores. However, demographic data is missing for the Miami store node 106. Due to the missing demographic data for the Miami store node 106, it is not clear where the node 106 belongs at the demographics level. To compensate for the missing data, a dummy node 152 is created at the Demographics level 124 showing that the demographics attribute data is missing for the Miami store node 106. Handling missing data in this manner allows the Miami store node 106 to be included in model forecasts and estimations despite the missing attribute data value. For example, calculations can still be made using the attribute-based hierarchy 150 based upon the Miami store's presence in a Southern climate zone as depicted in the Climate Zone level 122. Calculations can even be made based upon the fact that the Miami store node 126 is missing Demographic level 124 data.

Figure 10:
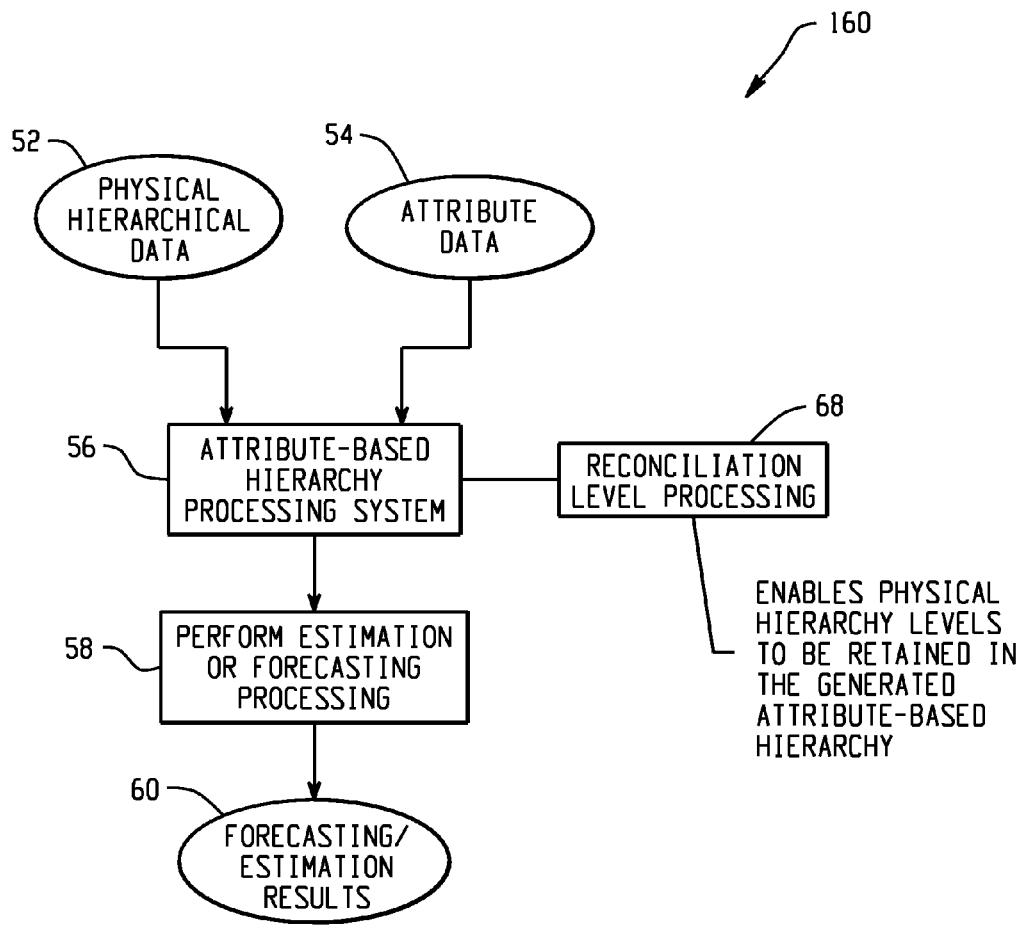
FIG. 10 is a block diagram depicting an attribute-based hierarchy processing system that includes reconciliation level processing.

As stated previously, it is sometimes desirable for levels of the physical hierarchy to be included in the generated attribute-based hierarchy. A user may specify one or more attribute-based levels that he desires to have in the attribute-based hierarchy as well as one or more physical levels from the physical hierarchy that he wishes to have retained for the attribute-based hierarchy. FIG. 10 depicts at 160 an attribute-based hierarchy processing system 56 that includes reconciliation level processing 68. The attribute-based hierarchy processing system 56 receives physical hierarchical data 52 and attribute data 54 inputs. In order to preserve certain physical hierarchy levels in the attribute-based hierarchy, mappings between the physical hierarchy nodes and their attribute-based correspondents are processed at 68. The attribute-based hierarchy processing system 56 generates an attribute-based hierarchy (not shown) that is used in performing estimation or forecasting processing 58 to produce forecasting/estimation results 60.

Figure 11:
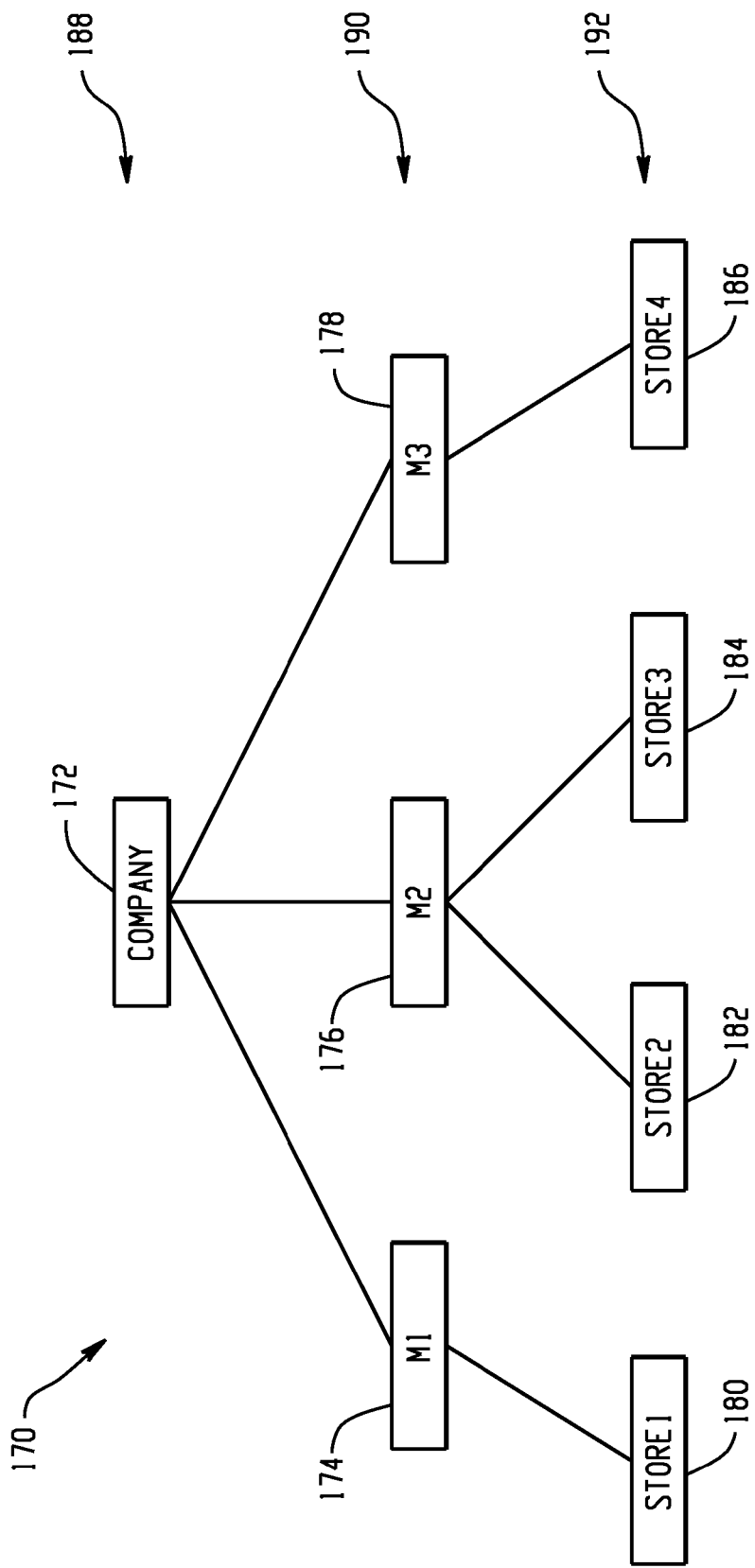
FIG. 11 depicts an example physical hierarchy.
Figure 12:
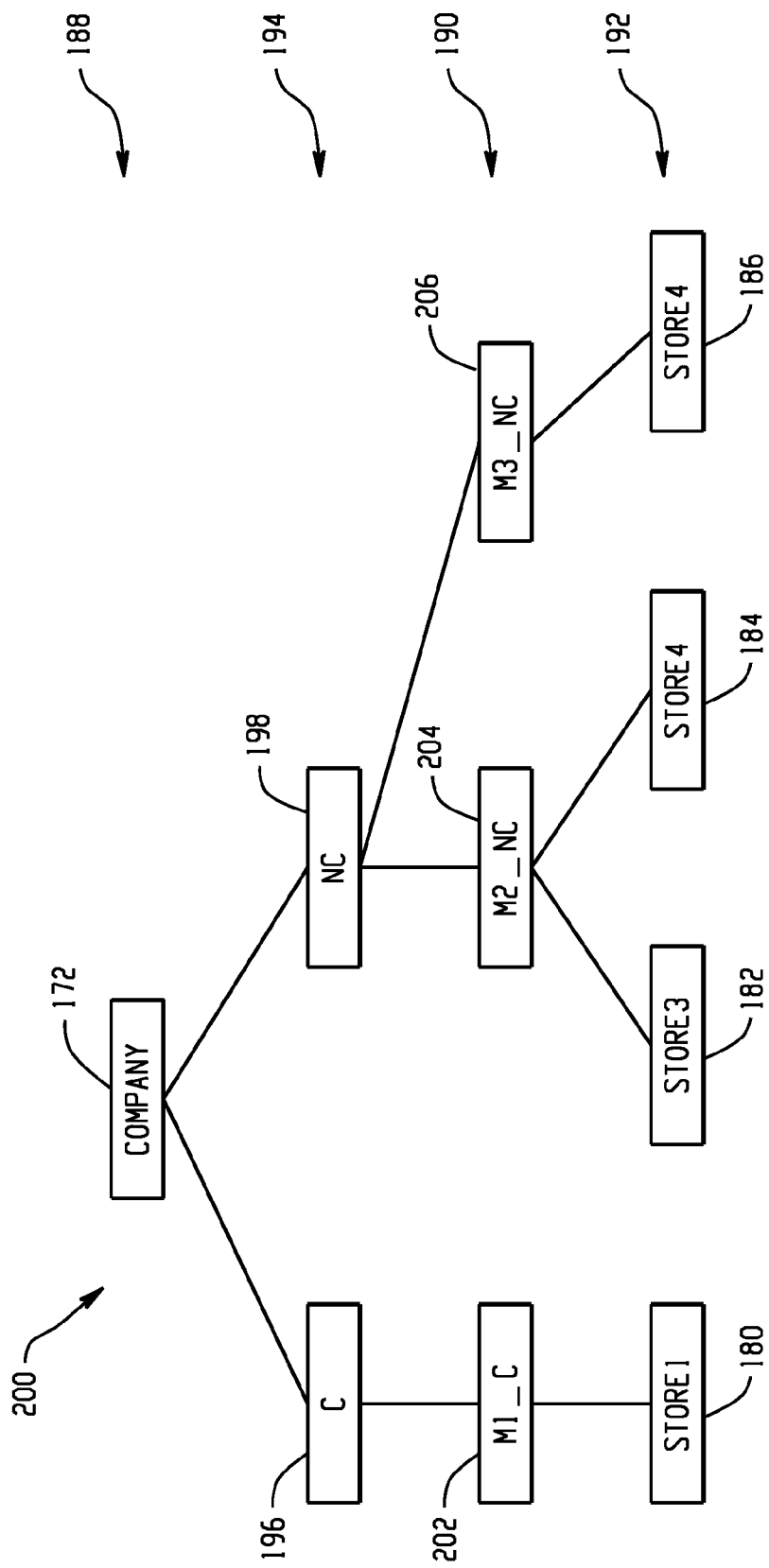
FIG. 12 depicts a resulting attribute hierarchy after reconciliation level processing.

FIGS. 11 and 12 depict an example of the reconciliation level processing 68 described with reference to FIG. 10. FIG. 11 depicts at 170 an example physical hierarchy which is used as input to the attribute-based hierarchy processing system 56. The physical hierarchy 170 of this example contains three levels: a Company level 188, a Market level 190, and a Store level 192. In this example the company operates in three markets and has four stores. Store1 180 resides in market 'M1' 174, Store2 182 and Store3 184 reside in market 'M2' 176, and Store4 186 resides in market 'M3' 178. The attribute-based hierarchy processing system 56 also receives the attribute data depicted in Table 4.

TABLE 4

Attribute Data

| Attribute Name | Store | Attribute Value |
| --- | --- | --- |
| Demographics | Store1 | City |
| Demographics | Store2 | Non-City |
| Demographics | Store3 | Non-City |
| Demographics | Store4 | Non-City |

FIG. 12 depicts at 200 a resulting attribute hierarchy after reconciliation level processing has been performed. In this example, it is desired to retain the Market level 190 when incorporating the Demographics level 194 into the attribute-based hierarchy 200. The Demographics level 194 divides the Company level 188 into City 196 and Non-City 188 branches. The Demographics level 194 is then further divided according to the Market level 190 data retained from the physical hierarchy 170 data depicted in FIG. 11. Thus, the City Branch 196 contains the 'M1' market node 202, and the Non-City Branch 198 contains the 'M2' market node 204 and the 'M3' market node 206 by linking the nodes in the physical hierarchy to the data received in the attribute data of Table 4. The attribute-based hierarchy processing system 56 also outputs the mapping table of Table 5 indicating the ordering of the levels and the inclusion of the Market level 190 of the physical hierarchy 170 in the attribute-based hierarchy 200.

TABLE 5

Mapping Table

| Level Id | Level Name | Is in physical |
| --- | --- | --- |
| 1 | Company | 1 |
| 2 | Demographics | 0 |
| 3 | Market | 1 |
| 4 | Store | 1 |

It may also be desirable to vary attribute-based levels within different model groups by incorporating the ability to process unbalanced tree structures. The ability to process and handle varying hierarchies within model groups can enable models to be designed that choose particular attributes and levels that suit specific model groups offering increased flexibility and predictive power for generating estimations and forecasts. In a hierarchy containing varying hierarchies among model groups, the levels within one model group (e.g., a branch) may differ from the levels within a second model group.

Figure 13:
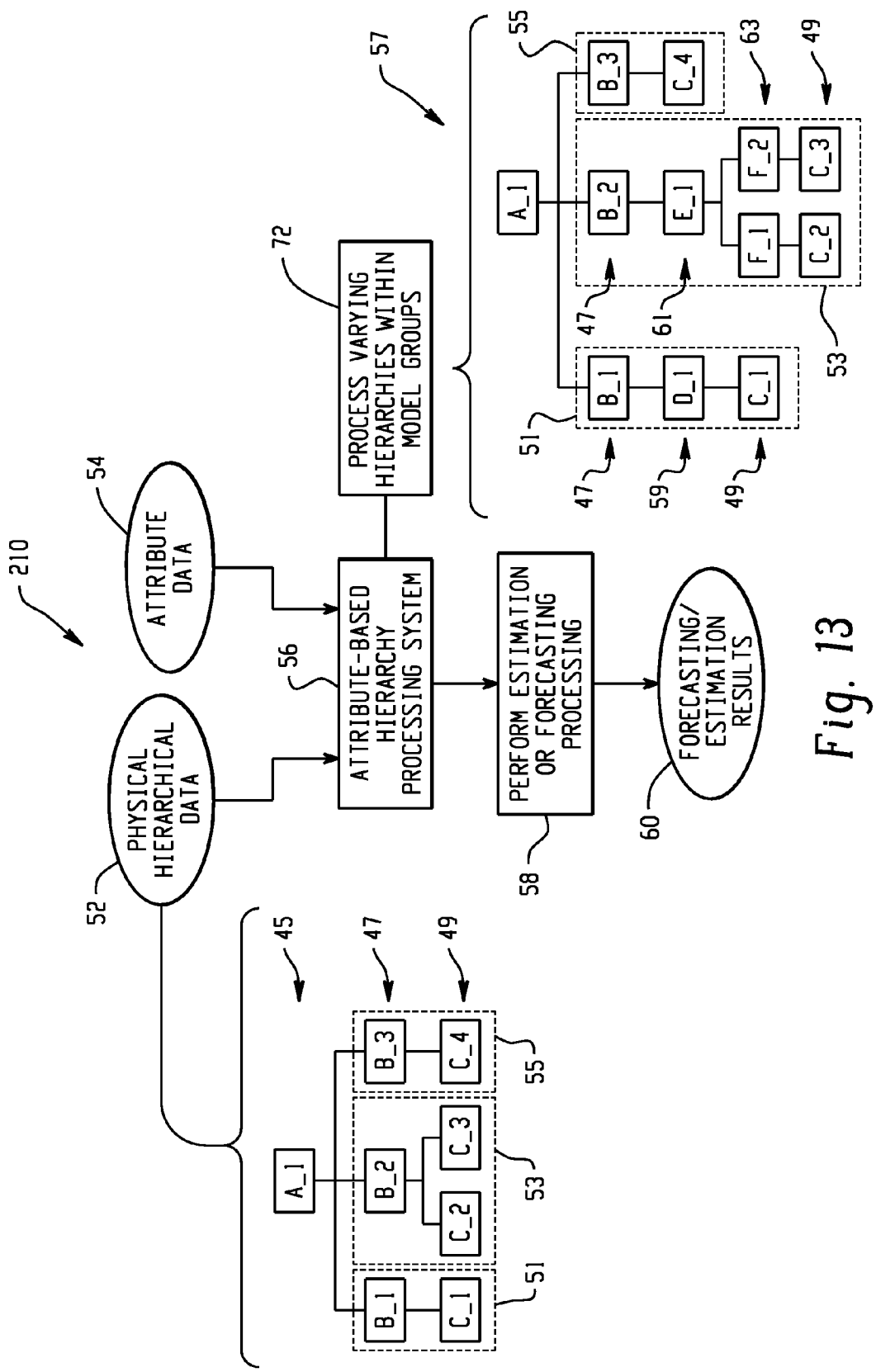
FIG. 13 is a block diagram depicting an attribute-based hierarchy processing system having model group hierarchy variation capabilities.

As an illustration, FIG. 13 depicts an attribute-based hierarchy processing system having model group hierarchy variation capabilities. The attribute-based hierarchy processing system 56 receives physical hierarchical data 52 and attribute data 54. The attribute data 54 may contain data relating to attribute levels that vary between model groups. The processing of these varying model groups is depicted at 72. The attribute-based hierarchy processing system 56 outputs an attribute-based hierarchy 57 and mapping table (not shown) that are utilized in performing estimation or forecasting 58 to generate forecasting/estimation results 60. As shown in FIG. 13, the physical hierarchy 52 contains three levels 45, 47, and 49 and three model groups 51, 53, and 55. After processing, the attribute-based hierarchy 57 contains varying hierarchies within the model groups. More specifically, model group 51 now contains the "b" level 47, the "d" level 59, and the "c" level 49 while model group 53 contains the "b" level 47, "e" level 61, "f" level 63, and the "c" level 49. Model groups having different levels among them are considered to possess varying hierarchies within the model groups.

Figure 14:
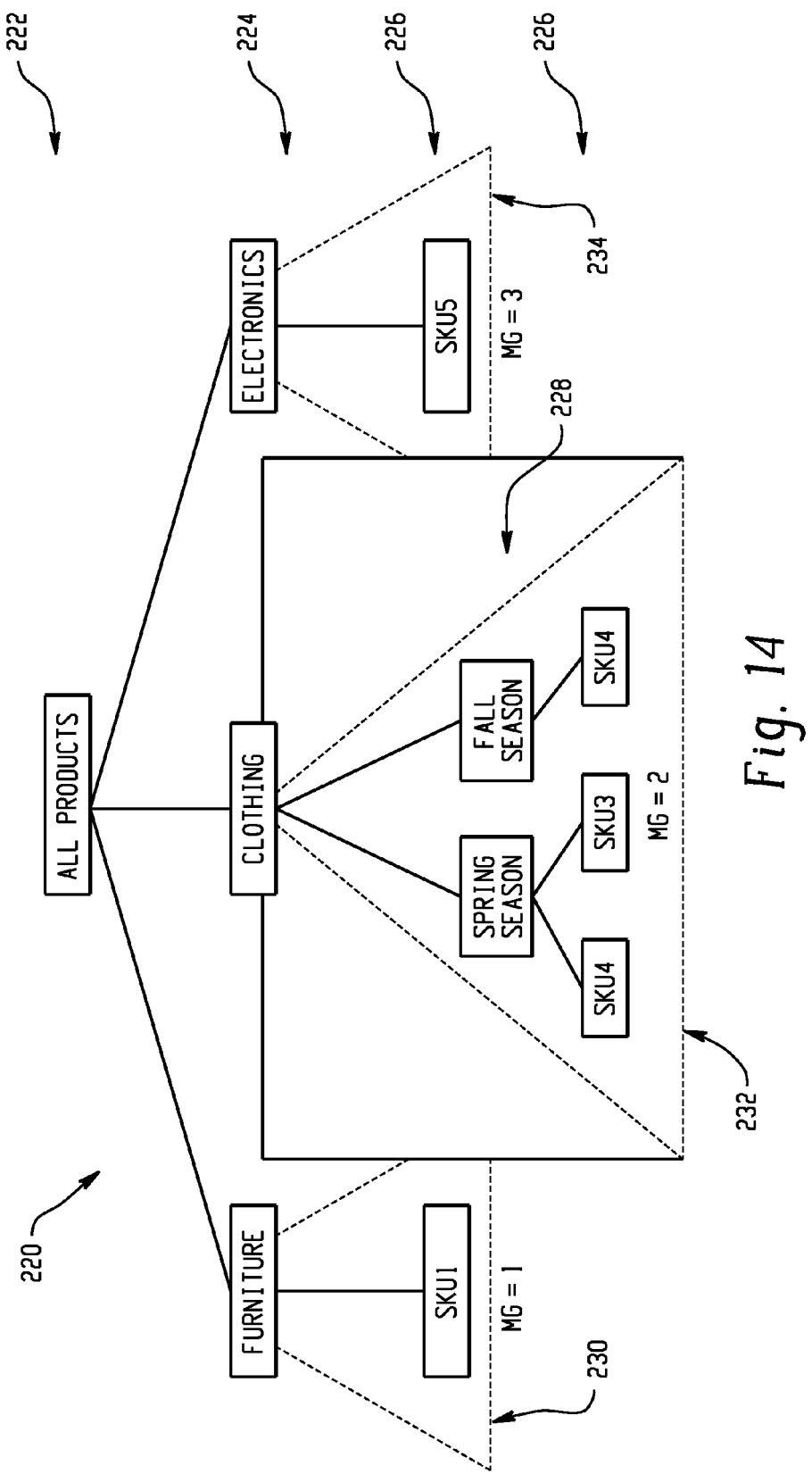
FIG. 14 depicts an example attribute-based hierarchy having model group hierarchy variation.

FIG. 14 depicts at 220 an example attribute-based hierarchy having model group hierarchy variation. In this example, the All Products level 222, the Product Type level 224, and the SKU level 226 are present in the physical hierarchy (not shown). The received attribute data directs that the Season level be included for the Clothing branch of the Product Type level 224 in the generated attribute-based hierarchy. To accomplish this, model groups 230, 232, and 234 containing the three branches of the Product Type level 224 are defined. Then, for the specific model group to be expanded, the desired attribute levels are incorporated. In the example of FIG. 14, the Season level 228 is incorporated into the Clothing model group 232.

Figure 15:
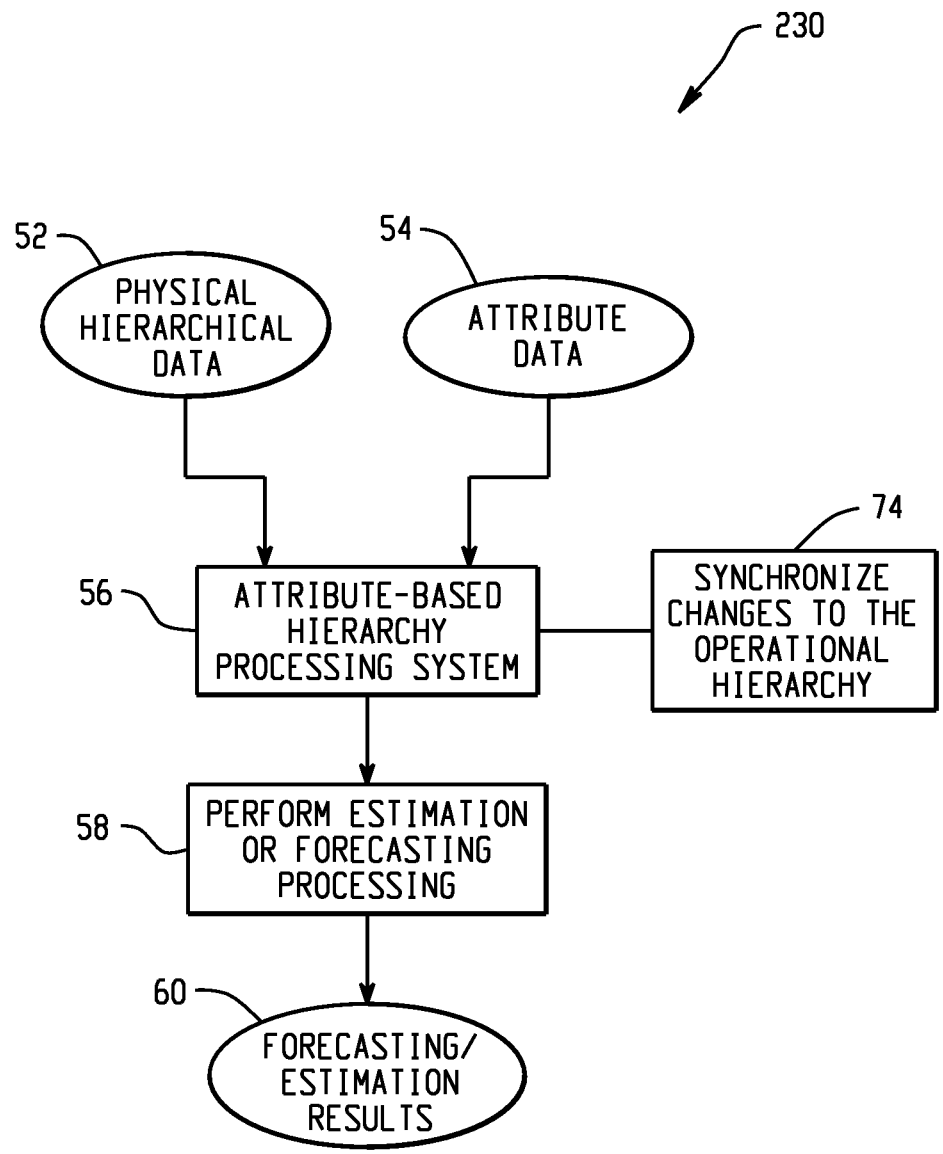
FIG. 15 is a block diagram depicting an attribute-based hierarchy processing system that includes synchronization functionality.

FIG. 15 depicts at 230 an attribute-based hierarchy processing system that includes synchronization functionality. The attribute-based hierarchy processing system 56 receives physical hierarchical data 52 and attribute data 54 to produce an attribute-based hierarchy and mapping tables (not shown) for use in performing estimation or forecasting processing 58 to generate forecasting/estimation results 60. As data in the physical hierarchical data 52 is updated, these changes are synchronized via process 74.

Via process 74, when new leaf nodes are added to the physical hierarchy or existing nodes are moved to a new parent, these changes can be reflected in the attribute based hierarchy without requiring the recalculation of historical aggregations. By using an attribute-based hierarchy for modeling, the effect of additions, deletions, and movement of nodes is reduced. New nodes may be inserted into the attribute hierarchy based on their attributes. If the attribute values of the new nodes are not present in the attribute-based hierarchy, then new branches may be added.

Figure 16:
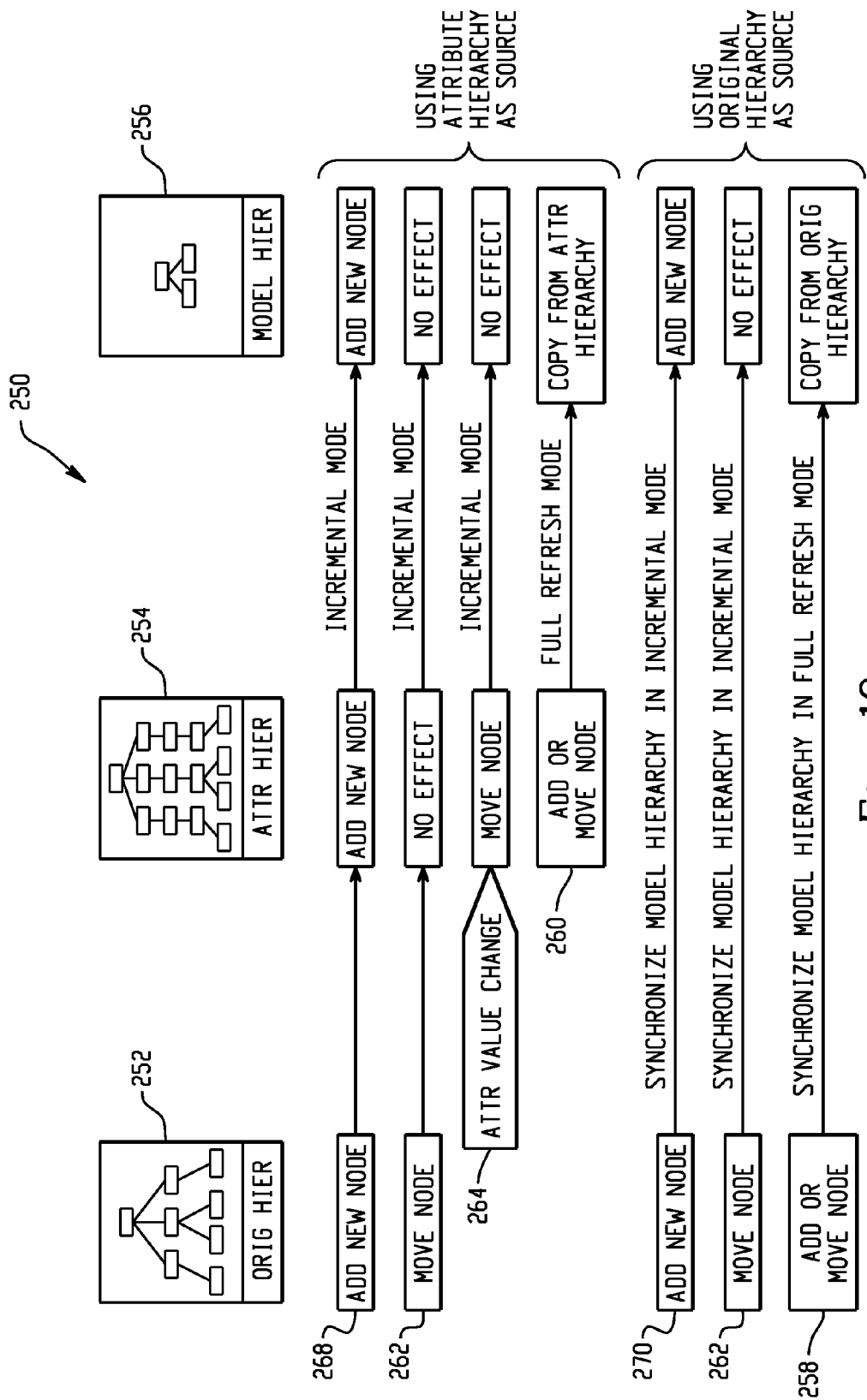
FIG. 16 depicts example synchronization protocols for updating a modeling hierarchy based on modifications to a physical hierarchy.

FIG. 16 depicts at 250 example synchronization protocols for updating a modeling hierarchy 256 based on modifications to a physical hierarchy 252 or an attribute hierarchy 254. A modeling hierarchy 256 is a snapshot of a physical hierarchy 252 or attribute hierarchy 254 at a point in time. The modeling hierarchy 256 is utilized in forecasting or model estimation analyses. The snapshot of data depicted in the model hierarchy 256 is utilized to avoid requiring a rebuild of the hierarchy used for analysis any time a modification is made to the physical hierarchy 252 or the attribute hierarchy 254. Thus, the model hierarchy 256 may continue to be used for analyses in light of minor changes to the physical hierarchy 252 and/or attribute hierarchy 254 until a change that is significant enough to require a modification or rebuild is applied to one of the source hierarchies 252, 254 according to the synchronization protocol 250. As an example, a synchronization protocol 250 is discussed below.

As shown in FIG. 16, there can be multiple modes for updating a model hierarchy 256. For example, when running in a refresh mode, the modeling hierarchy 256 may be immediately rebuilt upon changes to the physical hierarchy 252, as shown at 258, or changes to the attribute hierarchy 254, as shown at 260. An incremental mode that does not completely rebuild the model hierarchy 256 upon changes to the physical hierarchy 252 or attribute hierarchy 254 may offer processing time savings. For example, in the synchronization protocol 250 of FIG. 16, when physical hierarchy 252 or attribute hierarchy nodes 254 are moved 262, 264 or have their values changed 266, no changes are made to the model hierarchy 256. Instead, these changes are retained and applied at a later point in time when a full rebuild of the model hierarchy 256 is feasible. However, under the synchronization protocol 250, if a new node is added 268, 270 to the physical hierarchy 252 or attribute hierarchy 254, then that node is added to the model hierarchy 256. It should be noted that the synchronization protocol 250 depicted in FIG. 16 is an example protocol, and other protocols may be used. For example, the protocol may be changed such that addition of nodes 268, 270 to the physical hierarchy 252 or attribute hierarchy 254 does not result in an instant modification to the model hierarchy 256. Instead, these additions may be retained until a full rebuild of the model hierarchy is performed.

Figure 17:
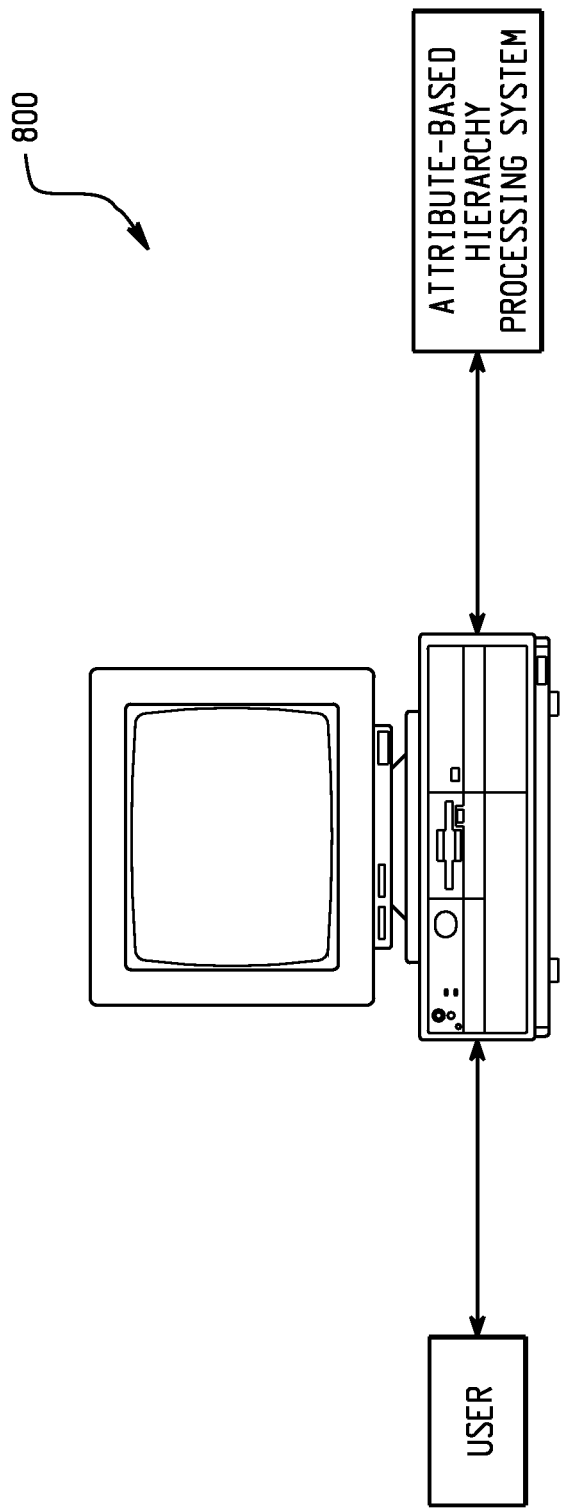
FIG. 17 is a block diagram depicting an environment wherein a user can interact with an attribute-based hierarchy processing system.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a single general purpose computer or workstation (as shown at 800 on FIG. 17), or on a networked system, or in a client-server configuration, or in an application service provider configuration. Additionally, a system may include all of the features described in this specification or any combination thereof.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for providing data records, comprising:
  accessing a physical hierarchy, wherein the physical hierarchy represents organizational data, wherein the physical hierarchy includes a plurality of transactional data records that are hierarchically arranged in levels, wherein the plurality of records include fields, wherein the fields include physical hierarchy fields and attribute hierarchy fields, and wherein each level in the physical hierarchy corresponds to a physical hierarchy field;
  identifying one or more attribute hierarchy fields within the plurality of records included in the physical hierarchy, wherein the one or more attribute hierarchy fields correspond to input fields of a predictive model;
  generating, by one or more data processors, an attribute hierarchy using the physical hierarchy, wherein the attribute hierarchy includes the plurality of records in the physical hierarchy re-categorized according to the one or more identified attribute hierarchy fields, wherein the attribute hierarchy includes one or more new levels, wherein the one or more new levels are new with respect to the physical hierarchy, and wherein each new level in the attribute hierarchy corresponds to an identified attribute hierarchy field;
  generating, by the one or more processors, a mapping table that identifies levels of the physical hierarchy and levels of the attribute hierarchy;
  receiving, a request from the predictive model, wherein the request specifies one or more records from a particular new level in the attribute hierarchy;
  providing the one or more records from the particular new level to the predictive model; and
  processing, by the one or more processors, the one or more records, wherein the one or more records are provided to the predictive model for generating estimation results or forecasting results.

2. The method of claim 1, further comprising:
  using the mapping table to recreate the attribute hierarchy when a significant change occurs in the physical hierarchy or the attribute hierarchy.

3. The method of claim 1, wherein one level of the physical hierarchy is associated with geographical locations.

4. The method of claim 1, wherein one level of the attribute hierarchy is associated with climate zones, demographic groups, store types, sales volumes, brands, prices, or store sizes.

5. The method of claim 2, wherein the mapping table identifies each new level in the attribute hierarchy.

6. The method of claim 2, wherein the mapping table identifies all levels in the attribute hierarchy.

7. The method of claim 6, wherein the mapping table further identifies which levels in the attribute hierarchy were present in the physical hierarchy.

8. The method of claim 2, wherein the attribute hierarchy includes a plurality of sub-hierarchies, and wherein a particular sub-hierarchy includes an additional level that is not present in other sub-hierarchies.

9. The method of claim 8, wherein the particular sub-hierarchy includes more levels than the other sub-hierarchies.

10. The method of claim 2, wherein a record in a new level is a dummy record that indicates a missing value for a corresponding attribute hierarchy field.

11. The method of claim 10, wherein the predictive model receives one or more records that are descendants of the dummy record.

12. The method of claim 2, wherein the transactional data records are associated with sales of a product.

13. The method of claim 1, wherein the physical hierarchy is representative of an operational framework of an organization or products or services provided by the organization.

14. The method of claim 1, wherein the particular new level corresponds to an identified attribute hierarchy field, and wherein the identified hierarchy field corresponds to an input field of the predictive model.

15. A system for providing data records, comprising:
  one or more processors;
  one or more computer-readable storage mediums containing instructions configured to cause the one or more processors to perform operations including:
  accessing a physical hierarchy, wherein the physical hierarchy represents organizational data, wherein the physical hierarchy includes a plurality of transactional data records that are hierarchically arranged in levels, wherein the plurality of records include fields, wherein the fields include physical hierarchy fields and attribute hierarchy fields, and wherein each level in the physical hierarchy corresponds to a physical hierarchy field;
  identifying one or more attribute hierarchy fields within the plurality of records included in the physical hierarchy, wherein the one or more attribute hierarchy fields correspond to input fields of a predictive model;
  generating an attribute hierarchy using the physical hierarchy, wherein the attribute hierarchy includes the plurality of records in the physical hierarchy re-categorized according to the one or more identified attribute hierarchy fields, wherein the attribute hierarchy includes one or more new levels, wherein the one or more new levels are new with respect to the physical hierarchy, and wherein each new level in the attribute hierarchy corresponds to an identified attribute hierarchy field;

generating a mapping table that identifies levels of the physical hierarchy and levels of the attribute hierarchy;

receiving a request from the predictive model, wherein the request specifies one or more records from a particular new level in the attribute hierarchy;

providing the one or more records from the particular new level to the predictive model; and processing the one or more records, wherein the one or more records are provided to the predictive model for generating estimation results or forecasting results.

16. The system of claim 15, wherein the operations further include:

using the mapping table to recreate the attribute hierarchy when a significant change occurs in the physical hierarchy or the attribute hierarchy.

17. The system of claim 15, wherein one level of the physical hierarchy is associated with geographical locations.

18. The system of claim 15, wherein one level of the attribute hierarchy is associated with climate zones, demographic groups, store types, sales volumes, brands, prices, or store sizes.

19. The system of claim 16, wherein the mapping table identifies each new level in the attribute hierarchy.

20. The system of claim 16, wherein the mapping table identifies all levels in the attribute hierarchy.

21. The system of claim 20, wherein the mapping table further identifies which levels in the attribute hierarchy were present in the physical hierarchy.

22. The system of claim 15, wherein the attribute hierarchy includes a plurality of sub-hierarchies, and wherein a particular sub-hierarchy includes an additional level that is not present in other sub-hierarchies.

23. The system of claim 22, wherein the particular sub-hierarchy includes more levels than the other sub-hierarchies.

24. The system of claim 15, wherein a record at a new level is a dummy record that indicates a missing value for a corresponding attribute hierarchy field.

25. The system of claim 24, wherein the predictive model receives one or more records that are descendants of the dummy record.

26. The system of claim 15, wherein the transactional data records are associated with sales of a product.

27. The system of claim 15, wherein the physical hierarchy is representative of an operational framework of an organization or products or services provided by the organization.

28. The system of claim 15, wherein the particular new level corresponds to an identified attribute hierarchy field, and wherein the identified hierarchy field corresponds to an input field of the predictive model.

29. A computer program product for providing data records, tangibly embodied in a machine-readable non-transitory storage medium, including instructions configured to cause a data processing system to:

access a physical hierarchy, wherein the physical hierarchy represents organizational data, wherein the physical hierarchy includes a plurality of transactional data records that are hierarchically arranged in levels, wherein the plurality of records include fields, wherein the fields include physical hierarchy fields and attribute hierarchy fields, and wherein each level in the physical hierarchy corresponds to a physical hierarchy field;

identify one or more attribute hierarchy fields within the plurality of records included in the physical hierarchy, wherein the one or more attribute hierarchy fields correspond to input fields of a predictive model;

generate an attribute hierarchy using the physical hierarchy, wherein the attribute hierarchy includes the plurality of records in the physical hierarchy re-categorized according to the one or more identified attribute hierarchy fields, wherein the attribute hierarchy includes one or more new levels, wherein the one or more new levels are new with respect to the physical hierarchy, and wherein each new level in the attribute hierarchy corresponds to an identified attribute hierarchy field;

generate a mapping table that identifies levels of the physical hierarchy and levels of the attribute hierarchy;

receive a request from the predictive model, wherein the request specifies one or more records from a particular new level in the attribute hierarchy;

provide the one or more records from the particular new level to the predictive model; and process the one or more records, wherein the one or more records are provided to the predictive model for generating estimation results or forecasting results.

30. The computer program product of claim 29, wherein the storage medium further includes instructions configured to cause the data processing apparatus to:

generate a mapping table that identifies levels of the physical hierarchy and levels of the attribute hierarchy; and use the mapping table to recreate the attribute hierarchy.

31. The computer program product of claim 29, wherein one level of the physical hierarchy is associated with geographical locations.

32. The computer program product of claim 29, wherein one level of the attribute hierarchy is associated with climate zones, demographic groups, store types, sales volumes, brands, prices, or store sizes.

33. The computer program product of claim 30, wherein the mapping table identifies each new level in the attribute hierarchy.

34. The computer program product of claim 30, wherein the mapping table identifies all levels in the attribute hierarchy.

35. The computer program product of claim 34, wherein the mapping table further identifies which levels in the attribute hierarchy were present in the physical hierarchy.

36. The computer program product of claim 30, wherein the attribute hierarchy includes a plurality of sub-hierarchies, wherein a particular sub-hierarchy includes an additional level that is not present other sub-hierarchies.

37. The computer program product of claim 36, wherein the particular sub-hierarchy includes more levels than the other sub-hierarchies.

38. The computer program product of claim 30, wherein a record in a new level is a dummy record that indicates a missing value for a corresponding attribute hierarchy field.

39. The computer program product of claim 38, wherein the predictive model receives one or more records that are descendants of the dummy record.

40. The computer program product of claim 30, wherein the transactional data records are associated with sales of a product.

41. The computer program product of claim 29, wherein the physical hierarchy is representative of an operational framework of an organization or products or services provided by the organization.

42. The computer program product of claim 29, wherein the particular new level corresponds to an identified attribute hierarchy field, and wherein the identified hierarchy field corresponds to an input field of the predictive model.

* * * * *